UNITED STATES PATENT OFFICE.

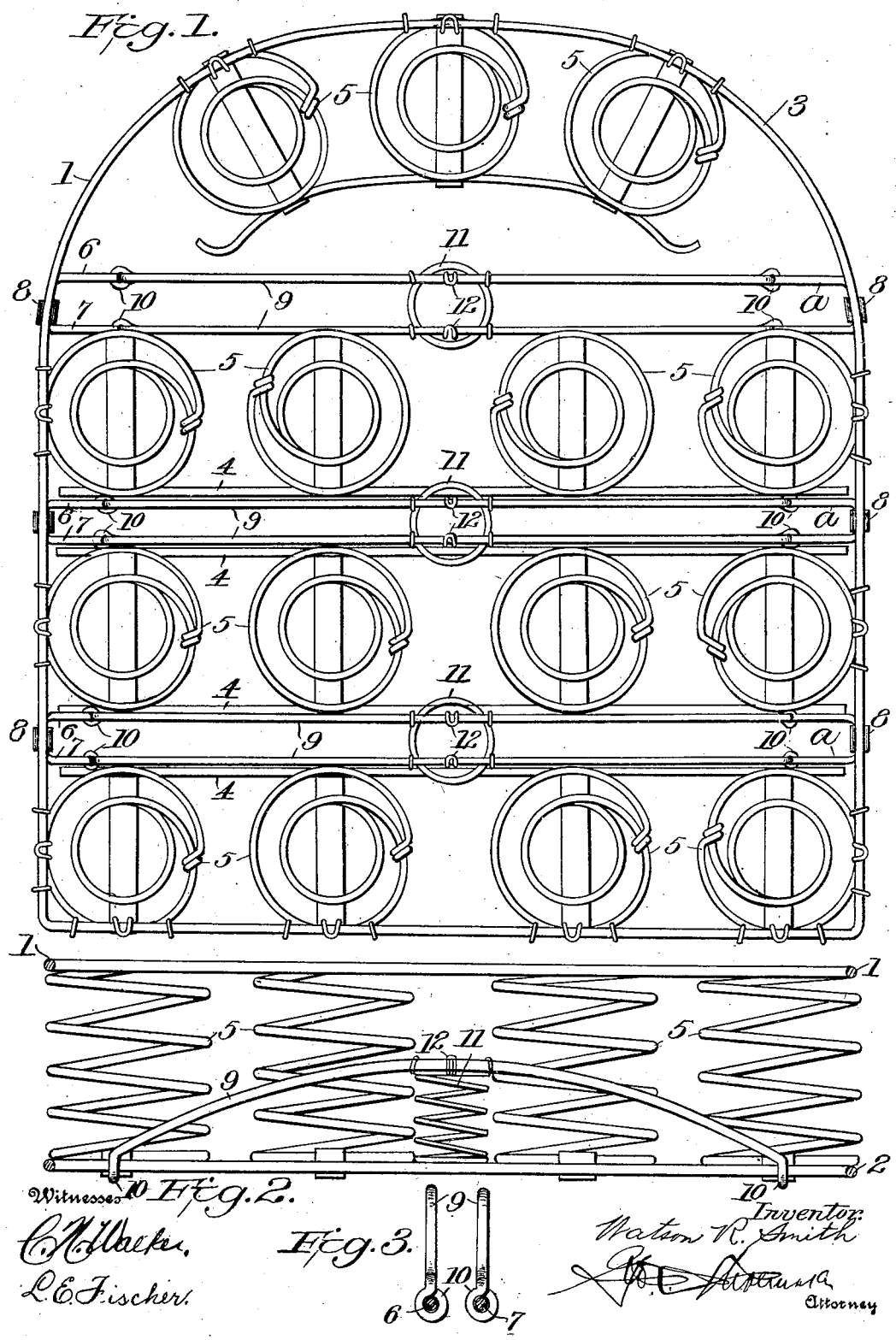

WATSON R. SMITH, OF JACKSON, MICHIGAN, ASSIGNOR TO JACKSON CUSHION SPRING COMPANY, OF JACKSON, MICHIGAN.

SPRING CONSTRUCTION.

935,702.  Specification of Letters Patent.  Patented Oct. 5, 1909.

Application filed September 3, 1908. Serial No. 451,575.

*To all whom it may concern:*

Be it known that I, WATSON R. SMITH, a citizen of the United States, residing at Jackson, in the county of Jackson and State of Michigan, have invented certain new and useful Improvements in Spring Constructions, of which the following is a specification.

This invention relates to spring constructions.

One object is to provide a spring construction for automobile or other seats embodying such characteristics that the rider of the structure will not be injured or inconvenienced by reason of contact with the support upon which the structure is mounted in the event that the seat should be jarred incident to the weight of a heavy rider or in the event of the vehicle contacting with an obstruction in the roadway.

Another object is to reinforce the main springs of the structure with one or more auxiliary springs adapted to be compressed when the structure is subjected to unusual weight, whereby the auxiliary springs will catch the extra weight and prevent the structure from being wholly compressed.

With the above and other objects in view, the present invention consists in the combination and arrangement of parts hereinafter more fully described, illustrated in the accompanying drawings and particularly pointed out in the appended claims, it being understood that changes may be made in the form, proportion, size and minor details without departing from the spirit or sacrificing any of the advantages of the invention.

In the drawings:—Figure 1 is a plan view of the invention. Fig. 2 is a transverse sectional view. Fig. 3 is an end view of one pair of auxiliary springs mounted upon their supporting wires, the supporting wires being shown in section.

Referring now more particularly to the accompanying drawings, the reference characters 1 and 2 indicate upper and lower edge wires which may be rectangular in formation or which may have one end curved, as indicated at 3.

The characters 4 indicate main spring supporting wires for the support of the main springs 5 within the edge wires. Disposed between rows of main springs are auxiliary supporting wires *a*, each including parallel members 6 and 7, the ends of the auxiliary supporting wires *a* being secured to the lower edge wire in any suitable manner, such for instance as by clips 8 of any suitable variety.

The character 9 indicates a pair of auxiliary arch supporting springs which extend substantially across the structure, each having its opposite ends bent at 10 to form eyes for slidable engagement with the parallel members 6 and 7 of the auxiliary supporting wires *a*.

It will be seen that the arch springs have their intermediate or highest points terminating short of the upper convolutions of the main springs so that if the main springs are subjected to a light pressure, the auxiliary arch springs will not be compressed at all, but only when the main springs have been partially compressed, thereby preventing the heavy weight of the rider from passing below the lower edge wire incident to the rider's own weight, or in the event of the vehicle striking an obstruction in the roadway and suddenly jarring the vehicle. When these auxiliary arch springs 9 are compressed their ends slide upon the auxiliary support wires, and their bodies move toward the latter.

If desired, I may dispose beneath each pair of auxiliary arch springs 9 intermediate the ends thereof one or more springs 11. It is preferred, however, that but one spring 11 be employed, and this spring is designed to cushion the pair of auxiliary springs 9, and prevent the latter from being forced into engagement with the auxiliary supporting wires or beneath the lower edge wire. As shown, each auxiliary spring of each pair is connected at its top to the auxiliary supporting wires by means of clips 12 which may be of any suitable construction.

From the foregoing, it will be understood that the auxiliary arch springs are not compressed or acted upon by the weight of the rider of the structure until the main springs have been partially compressed. It will also be understood that when the auxiliary springs are compressed that they are cushioned by one or more springs 11 beneath them, and the springs 11 serve to return the arch springs to their normal positions after compression, the opposite ends of the arch springs sliding away from each other when compressed and toward each other when relieved of pressure.

What is claimed is:—

1. In a spring construction, a frame, main springs in the frame, a pair of arch springs arranged between rows of main springs to catch extra weight, and a spring arranged beneath each pair of arch springs.

2. A spring construction comprising a frame, main springs mounted in the frame, a pair of arch springs slidably mounted in the frame between rows of main springs to catch extra weight, and a spring arranged beneath each pair of arch springs.

3. In a spring construction, a frame, main springs in the frame, auxiliary spring supporting members mounted in the frame between rows of main springs and including spaced members, spaced auxiliary arch springs slidably mounted upon each parallel member of the auxiliary spring supporting wires to catch extra weight, and a cushioning element arranged beneath the auxiliary springs.

4. A spring construction comprising a frame, main springs mounted within the frame, auxiliary supporting wires mounted in the frame between rows of main springs, a pair of arch springs each formed of resilient material and having its opposite ends bent to form an eye for sliding engagement with the auxiliary supporting wires and a spring connected to each pair of arch springs.

5. A spring construction comprising a frame, main springs mounted within the frame, auxiliary supporting wires mounted in the frame between rows of main springs, a pair of arch springs each formed of resilient material and having its opposite ends bent to form an eye for sliding engagement with the auxiliary supporting wires, and a spring mounted beneath each auxiliary spring.

6. In a spring construction, a frame, main springs mounted in the frame, a pair of arch springs slidably mounted at each end in the frame between rows of main springs to catch extra weight and a supporting connection between the arch springs.

7. In a spring construction, a frame, main springs in the frame, a plurality of parallel auxiliary springs in the frame between rows of main springs to catch extra weight, and a supporting connection between the auxiliary springs and disposed intermediate the ends thereof to hold them against lateral displacement and to coöperate therewith to catch extra weight.

8. In a spring construction, a frame, main springs in the frame, a pair of auxiliary arch springs mounted in the frame between rows of main springs to catch extra weight, and a yieldable supporting connection between the auxiliary arch springs intermediate the ends thereof to hold them against lateral displacement and to coöperate therewith to catch extra weight.

9. In a spring construction, a frame, main springs in the frame, a plurality of parallel auxiliary arch springs in the frame between rows of main springs mounted to catch extra weight, the ends of the auxiliary arch springs terminating short of the sides of the frame, and a supporting connection between the auxiliary arch springs.

10. In a spring construction, a frame, main springs in the frame, a pair of auxiliary springs mounted in the frame to catch extra weight, a pair of wires upon which the auxiliary springs are mounted, the latter each having an eye at each end for slidable engagement with the corresponding aforesaid wires, and a spring beneath the auxiliary springs to cushion and support them upon said wires.

11. In a spring construction, a frame, main springs in the frame, pairs of auxiliary arch springs mounted in the frame between rows of main springs to catch extra weight, and a connection between each pair of auxiliary springs adapted to retain the latter in operative position.

12. In a spring construction, a frame, main springs in the frame, a pair of arch springs arranged between rows of main springs to catch extra weight, and yieldable means arranged beneath each pair of arch springs for coöperation with the latter.

13. In a spring construction, a frame, main springs mounted in the frame, a pair of arch springs mounted to slide bodily in the frame between rows of main springs and subject to compression to catch extra weight, and yieldable means arranged beneath each pair of auxiliary springs for coöperation with the latter.

14. In a spring construction, a frame, main springs in the frame, a plurality of parallel auxiliary arch springs in the frame between rows of main springs to catch extra weight, the ends of the auxiliary arch springs terminating short of the sides of the frame and having slidable mounting at their ends, and a supporting connection beneath the parallel auxiliary arch springs.

In testimony whereof I affix my signature, in presence of two witnesses.

WATSON R. SMITH.

Witnesses:
 ETHEL M. PHELAN,
 GRACE E. PERKINS.